US008984880B2

(12) United States Patent
Marques et al.

(10) Patent No.: US 8,984,880 B2
(45) Date of Patent: Mar. 24, 2015

(54) TURBINE WASTEGATE

(71) Applicant: Honeywell International Inc., Morristown, NJ (US)

(72) Inventors: Manuel Marques, Richardmenil (FR); Jean-Jacques Laissus, Thaon les Vosges (FR); Jose Alves, Frizon (FR)

(73) Assignee: Honeywell International Inc., Morristown, NJ (US)

(*) Notice: Subject to any disclaimer, the term of this patent is extended or adjusted under 35 U.S.C. 154(b) by 4 days.

(21) Appl. No.: 13/974,326

(22) Filed: Aug. 23, 2013

(65) Prior Publication Data
US 2014/0072412 A1 Mar. 13, 2014

Related U.S. Application Data

(63) Continuation-in-part of application No. 13/613,250, filed on Sep. 13, 2012, and a continuation-in-part of application No. 13/949,384, filed on Jul. 24, 2013.

(51) Int. Cl.
F02D 23/00 (2006.01)
F01D 17/10 (2006.01)
(Continued)

(52) U.S. Cl.
CPC ............. F01D 17/10 (2013.01); F16K 1/2014 (2013.01); F01D 17/105 (2013.01); F02B 37/183 (2013.01); Y02T 10/144 (2013.01); F05D 2220/40 (2013.01)
USPC .......................................................... 60/602

(58) Field of Classification Search
CPC ...... F02B 37/18; F02B 37/183; F02B 37/186; F01D 17/105; F01D 17/20; F01D 25/24; F05D 2220/40; F05D 2240/14

USPC ............................................. 60/602; 415/144
See application file for complete search history.

(56) References Cited

U.S. PATENT DOCUMENTS 1,524,267 A * 1/1925 Loop ............................. 251/167
2,679,864 A * 6/1954 Harke .......................... 137/635
4,121,607 A 10/1978 Bader
(Continued)

FOREIGN PATENT DOCUMENTS

DE 4439432 C1 11/1995
DE 19727141 C1 8/1998
(Continued)

OTHER PUBLICATIONS

Translation DE 19853391 A1, Mar. 3, 2014.*
(Continued)

Primary Examiner — Thai Ba Trieu
Assistant Examiner — Jason T Newton
(74) Attorney, Agent, or Firm — Brian J. Pangrle

(57) ABSTRACT

An assembly can include a turbine housing that includes a bore, a wastegate seat and two wastegate passages that extend to the wastegate seat; a rotatable wastegate shaft configured for receipt by the bore; a wastegate arm extending from the wastegate shaft; and a wastegate plug extending from the wastegate arm where the wastegate plug comprises a profile defined in part by a portion of a torus, for contacting the wastegate seat in a closed state, and defined in part by two plug portions, for defining clearances with respect to the wastegate seat in an open state. Various other examples of devices, assemblies, systems, methods, etc., are also disclosed.

18 Claims, 17 Drawing Sheets

(51) Int. Cl.
*F16K 1/20* (2006.01)
*F02B 37/18* (2006.01)

(56) References Cited

U.S. PATENT DOCUMENTS

| | | | | |
|---|---|---|---|---|
| 4,480,815 | A * | 11/1984 | Kreij | 251/298 |
| 4,531,532 | A * | 7/1985 | Zimmerly | 137/15.06 |
| 4,611,465 | A * | 9/1986 | Kato et al. | 60/602 |
| 4,702,209 | A | 10/1987 | Sausner et al. | |
| 4,730,456 | A * | 3/1988 | Tadokoro et al. | 60/602 |
| 4,962,911 | A * | 10/1990 | Soderberg | 251/159 |
| 5,044,604 | A | 9/1991 | Topham et al. | |
| 5,046,317 | A * | 9/1991 | Satokawa | 60/602 |
| 5,996,348 | A * | 12/1999 | Watkins | 60/602 |
| 6,035,638 | A * | 3/2000 | Lamsbach et al. | 60/602 |
| 6,969,048 | B2 | 11/2005 | Colic et al. | |
| 7,063,099 | B2 * | 6/2006 | Hartley | 137/15.18 |
| 7,284,542 | B2 * | 10/2007 | Wright | 123/527 |
| 8,336,309 | B2 * | 12/2012 | McEwan et al. | 60/602 |
| 2001/0010801 | A1 * | 8/2001 | Turner | 418/68 |
| 2006/0213195 | A1 * | 9/2006 | Leavesley | 60/605.1 |
| 2006/0239812 | A1 | 10/2006 | Friedel et al. | |
| 2007/0068496 | A1 * | 3/2007 | Wright | 123/527 |
| 2008/0237526 | A1 | 10/2008 | Albert et al. | |
| 2009/0014674 | A1 * | 1/2009 | Grissom et al. | 251/298 |
| 2009/0151352 | A1 * | 6/2009 | McEwan et al. | 60/602 |
| 2011/0000209 | A1 * | 1/2011 | Boening et al. | 60/602 |
| 2011/0173974 | A1 * | 7/2011 | Grabowska | 60/602 |
| 2011/0175025 | A1 * | 7/2011 | Schall | 252/182.33 |
| 2012/0055154 | A1 * | 3/2012 | Ebert | 60/602 |
| 2012/0085091 | A1 * | 4/2012 | Melchior | 60/600 |
| 2012/0204570 | A1 * | 8/2012 | Herdin | 60/773 |
| 2012/0210709 | A1 * | 8/2012 | Cizek | 60/602 |
| 2012/0312010 | A1 * | 12/2012 | Yasoshima | 60/602 |
| 2013/0309106 | A1 * | 11/2013 | Yanagida | 417/406 |

FOREIGN PATENT DOCUMENTS

| | | | |
|---|---|---|---|
| DE | 19853391 A1 * | 5/2000 | F02B 37/18 |
| DE | 19853392 A1 * | 5/2000 | F02B 37/18 |
| DE | 102006028800 A1 | 12/2007 | |
| DE | 102006046826 A1 * | 4/2008 | F02B 37/18 |
| DE | 102009015899 A1 | 10/2010 | |
| EP | 0401615 A1 | 12/1990 | |
| EP | 1988265 A1 | 11/2008 | |
| EP | 2251533 A1 | 11/2010 | |
| EP | 2489853 A1 | 8/2012 | |
| WO | 2009106161 A1 | 9/2009 | |

OTHER PUBLICATIONS

Translation DE 19853392 A1, Mar. 3, 2014.*
Translation DE 102006046826 A1, Mar. 3, 2014.*
Translation Description DE19853391 (A1), May 25, 2000, entire document.*
Translation Description DE19853392 (A1), May 31, 2000, entire document.*
Translation Description DE102006046826 (A1), Apr. 3, 2008, entire document.*
EP Appl. No. 13183260.2—1606 EPO Search Report Dec. 18, 2013 (5 pages).
EP Appl. No. 13183260.2—1606 EPO Exam Report Jan. 31, 2014 (7 pages).
Weisstein, Eric W. "Spherical Cap." From MathWorld—A Wolfram Web Resource. http://mathworld.wolfram.com/SphericalCap.html (2 pages).
Weisstein, Eric W. "Spherical Wedge." From MathWorld—A Wolfram Web Resource. http://mathworld.wolfram.com/SphericalWedge.html (1 page).

* cited by examiner

TURBINE WASTEGATE

RELATED APPLICATIONS

This application is a continuation-in-part of a U.S. patent application having Ser. No. 13/613,250, filed 13 Sep. 2012, which is incorporated by reference herein, and this application is a continuation-in-part of a U.S. patent application having Ser. No. 13/949,384, filed 24 Jul. 2013, which is incorporated by reference herein, and which is a continuation-in-part of the U.S. patent application having Ser. No. 13/613,250.

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates and wastegate components are described herein, which can optionally provide for improved kinematics, reduced exhaust leakage, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
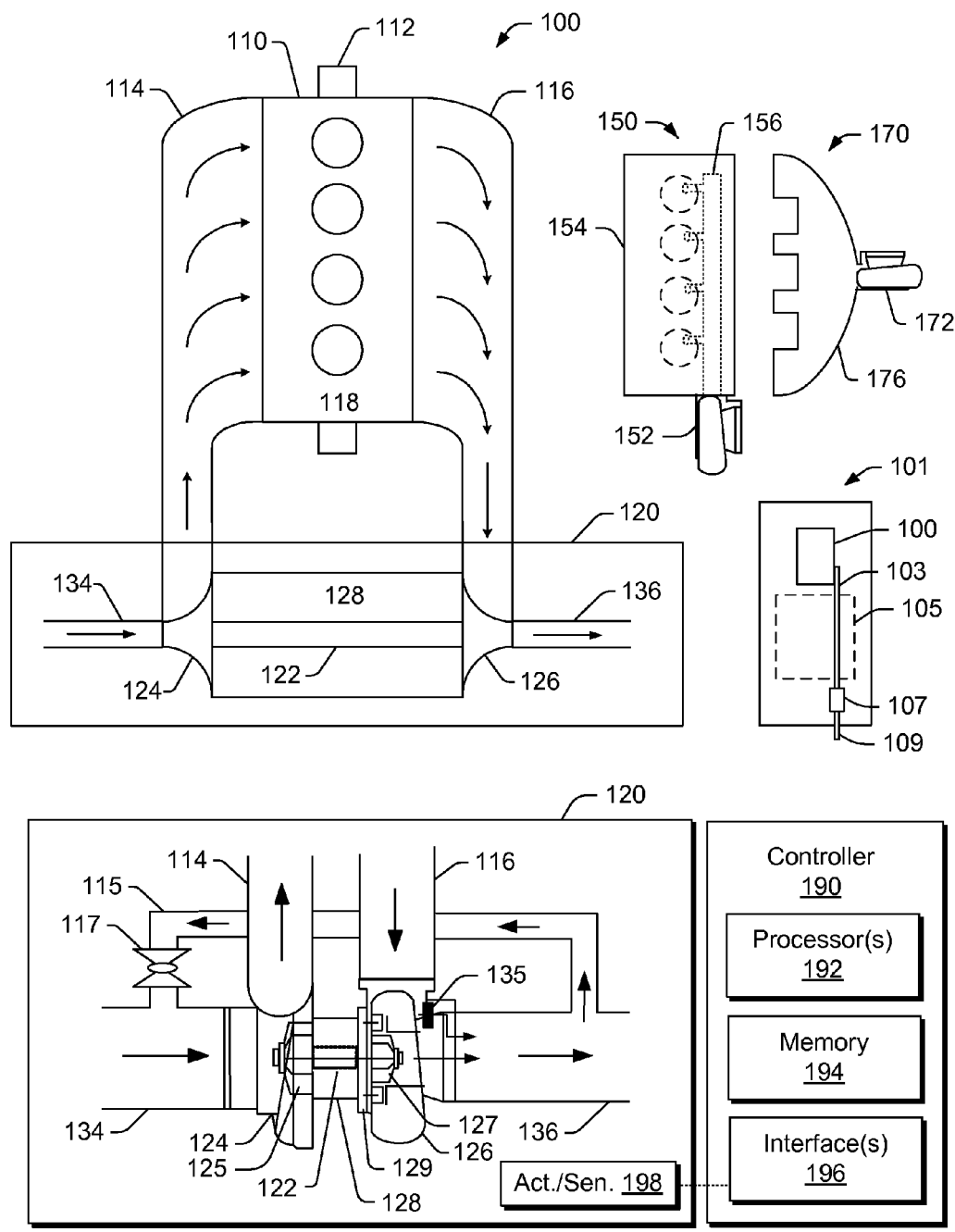
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
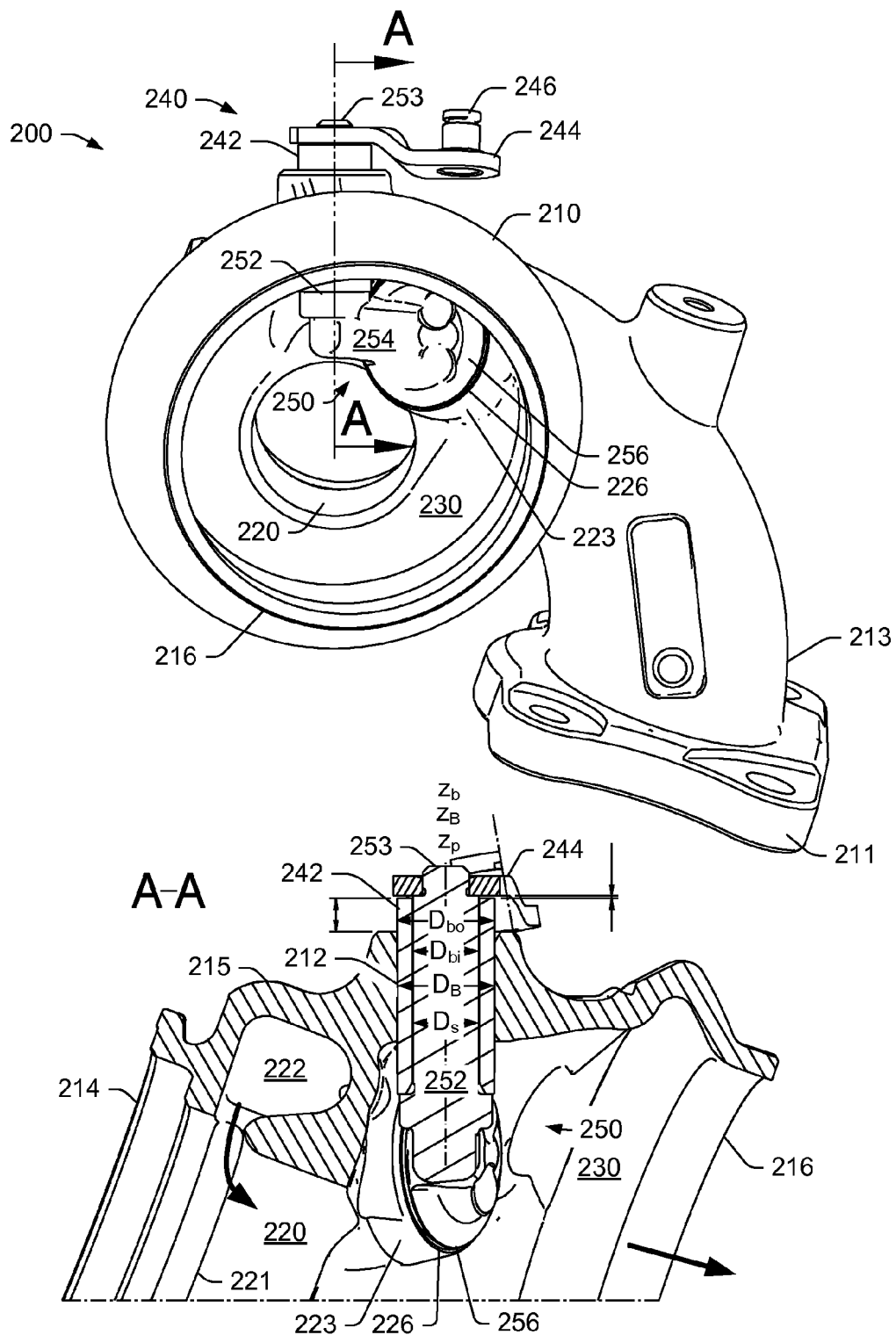
FIG. 2 is a series of view of an example of an assembly that includes a wastegate.

FIG. 2 shows an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via sand casting or other casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing includes an inner diameter $D_{bi}$ and an outer diameter $D_{bo}$. In the example of FIG. 2, when the various components are assembled, $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216. As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 3:
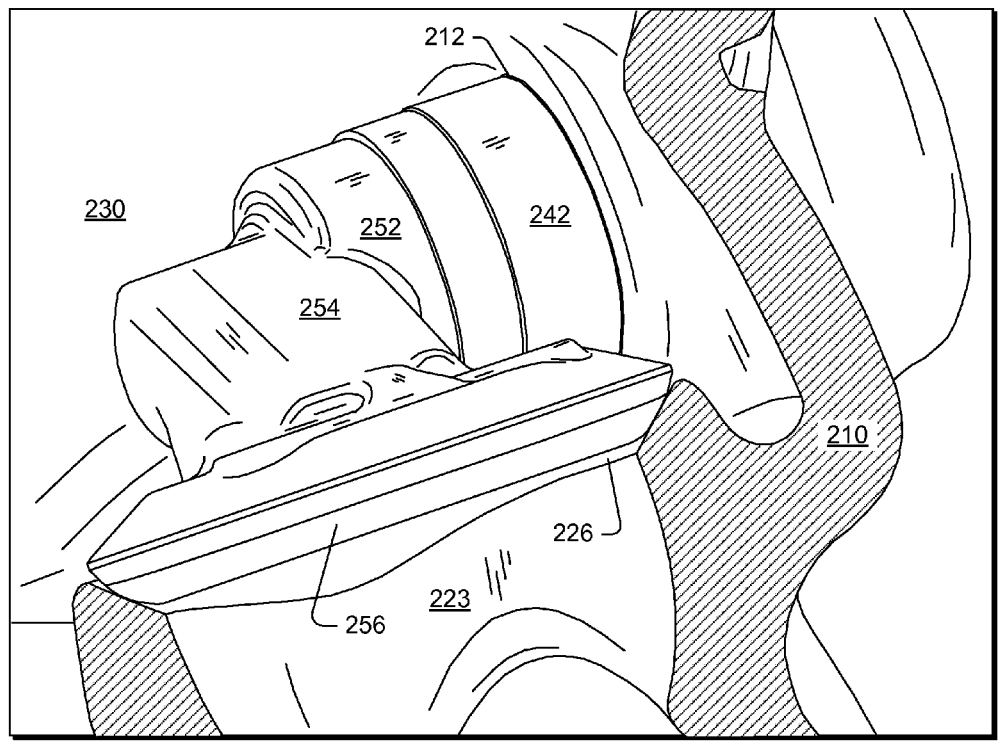
FIG. 3 is a cutaway view of a portion of the assembly of FIG. 2.

FIG. 3 shows an enlarged cutaway view of a portion of the assembly 200 of FIG. 2. As shown, the plug 256 seats in the wastegate seat 226 to seal the wastegate passage defined by the wastegate wall 223, which is part of the turbine housing 210.

Figure 4:
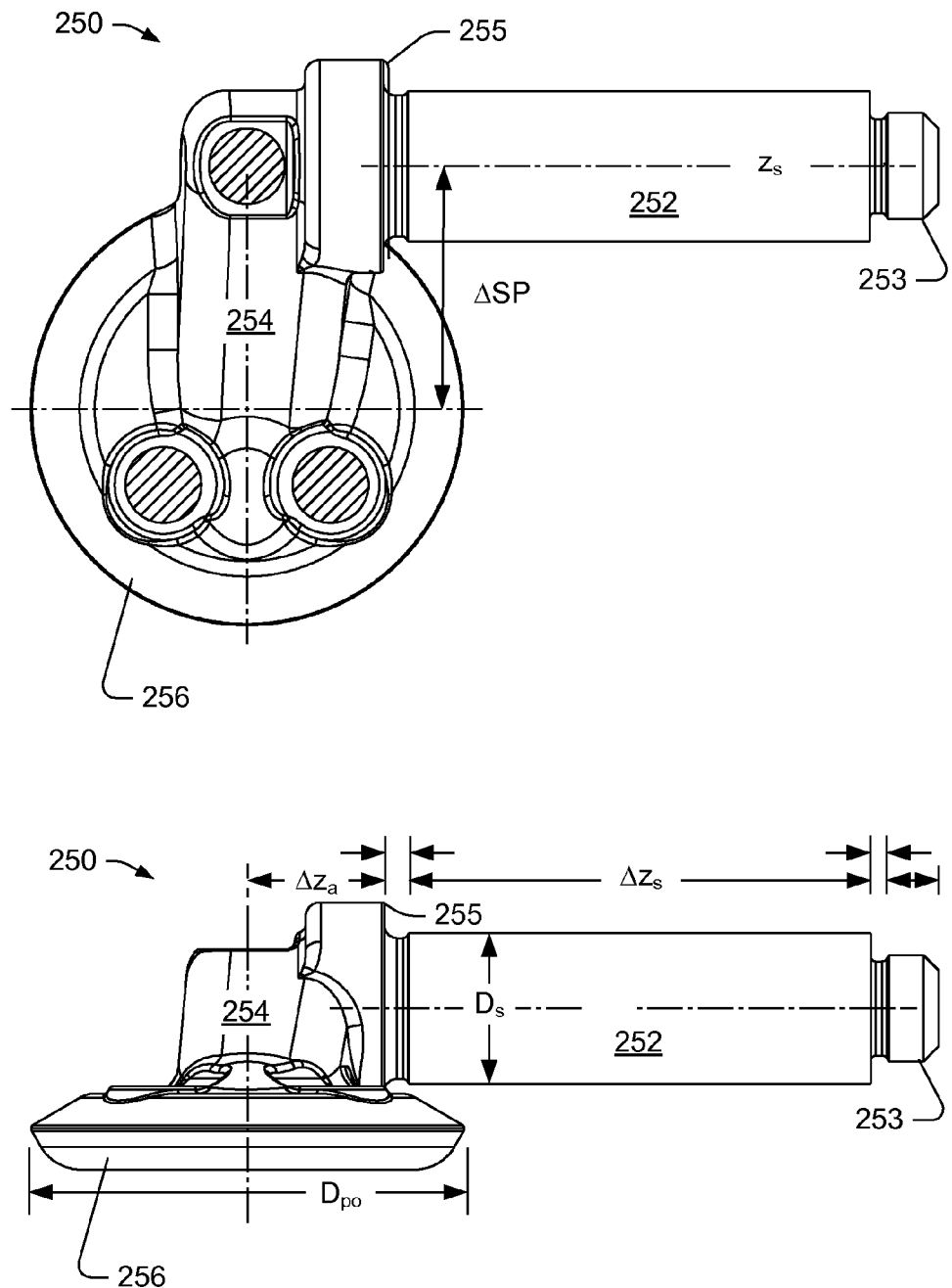
FIG. 4 is a series of views of an example of a wastegate arm and plug.

FIG. 4 shows a plan view and a side view of the wastegate arm and plug 250 of the assembly of FIG. 2. As shown, the shaft 252 has a diameter $D_s$ over a length $\Delta z_s$. The arm 254 extends axially outwardly away from the shaft 252 from a shoulder 255 and radially downwardly to the plug 256. An axial dimension $\Delta z_a$ is shown in the example of FIG. 4 as being a distance from the shoulder 255 to a centerline of the plug 256. The plug 256 is shown as having an outer diameter $D_{po}$. A dimension $\Delta SP$ is shown in the plan view as an offset between the axis $z_s$ of the shaft 252 and the centerline of the plug 256. As an example, the centerline of the plug 256 may define or coincide with an x-axis that may, for example, be used as a reference to describe features of the arm 254, the plug 256, angles of rotation of the arm 254 and the plug 256, etc. The dimension $\Delta SP$ may be a leg of a triangle that, for example, defines a hypotenuse as a dimension between a rotational axis of the arm 254 and the centerline of the plug 256. FIG. 4 also shows various other features, for example, shaft features such as shoulders, contours, etc.

Figure 5:
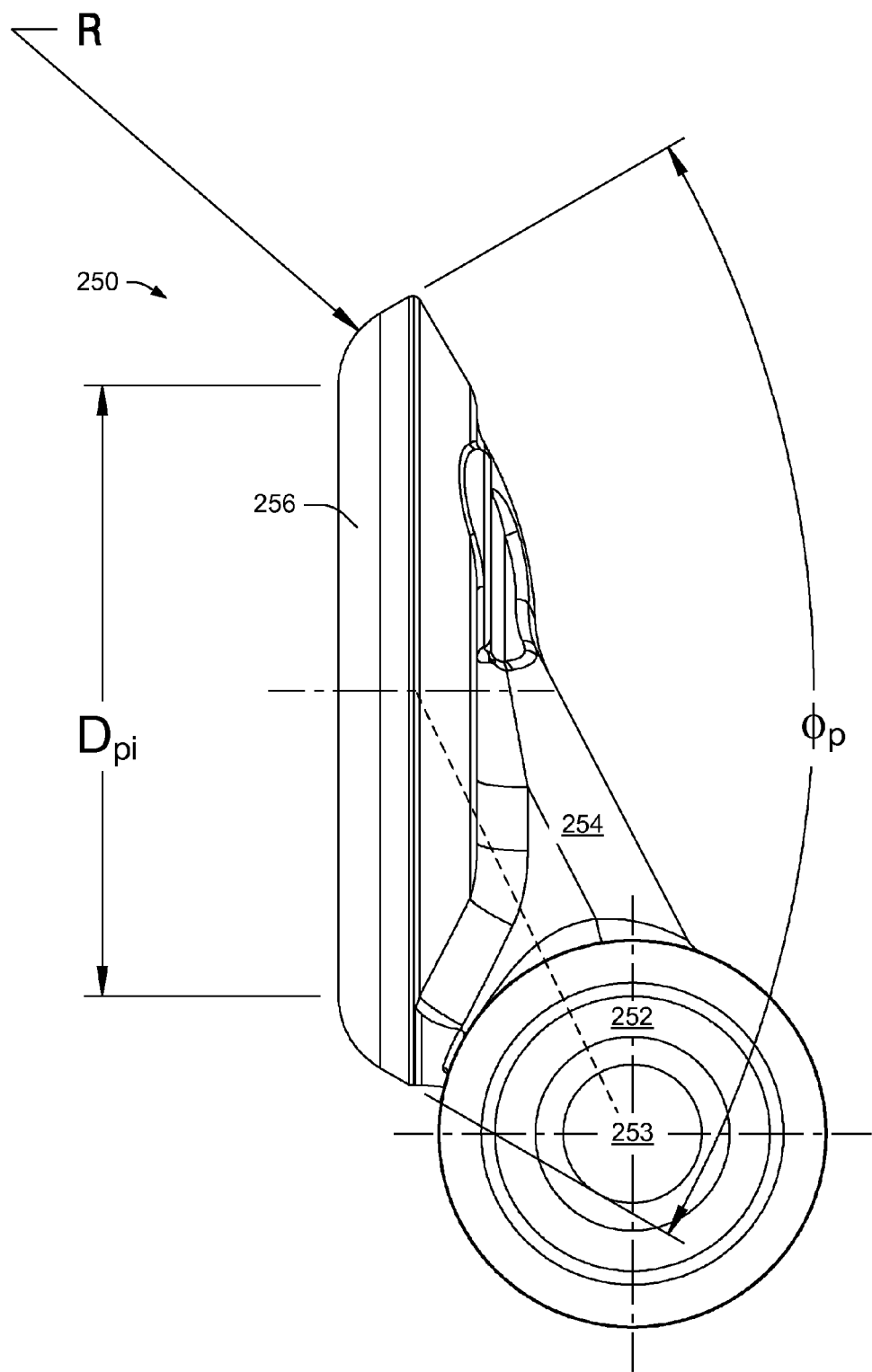
FIG. 5 is a side view of the wastegate arm and plug of FIG. 4.

FIG. 5 shows another side view of the wastegate arm and plug 250. In the example of FIG. 5, a profile of the plug 256 is illustrated that includes a conical portion and a radiused portion that may define an inner diameter $D_{pi}$. As shown, the conical portion may be defined according to a cone angle $\phi_p$ while the radiused portion may be defined with respect to a radius R. As an example, the radiused portion may be referred to as a toroidal portion or a toroidal surface. While the toroidal portion extends to a conical portion in the example of FIG. 4, a toroidal portion may continue as a radiused portion or extend to a non-conical or other portion. As an example, a plug can include toroidal surface disposed between an inner diameter and an outer diameter of a plug (e.g., a toroidal surface disposed between $D_{pi}$ and $D_{po}$).

Figure 6:
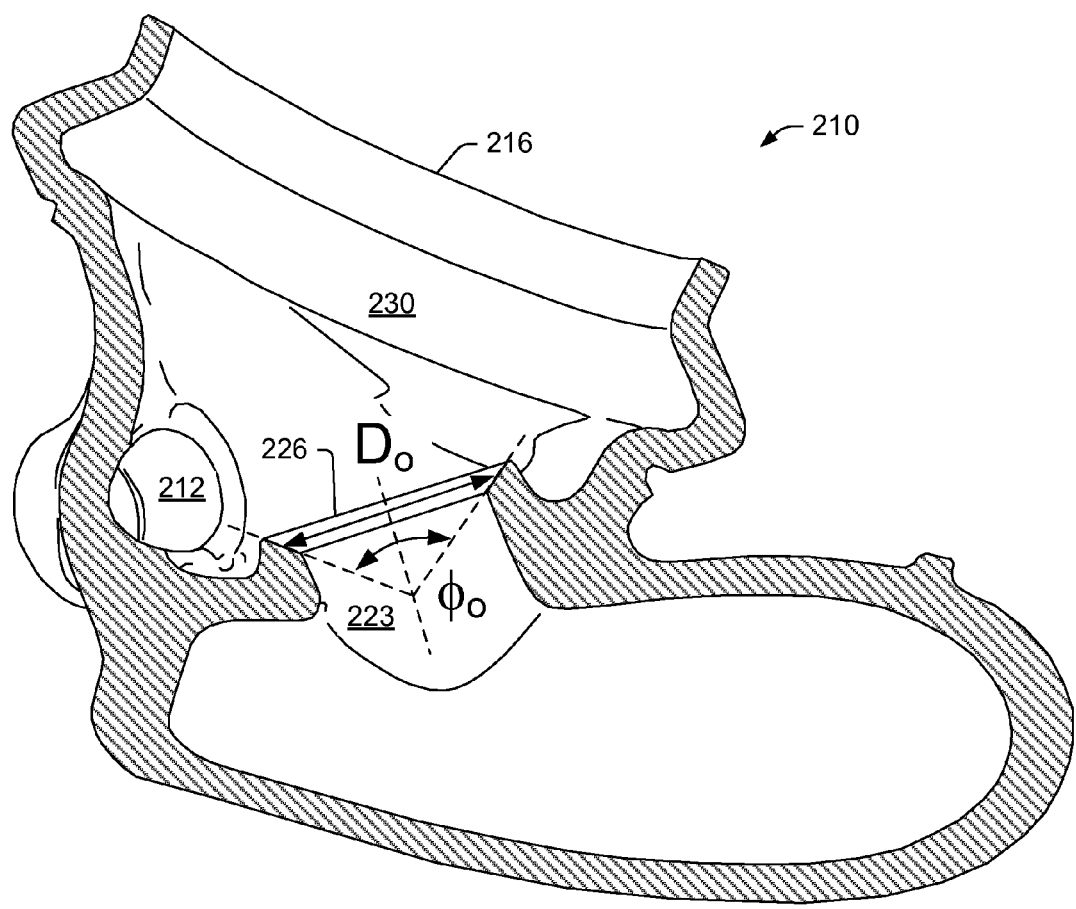
FIG. 6 is a cutaway view of an example of a turbine housing.

FIG. 6 shows a cutaway view of the turbine housing 210, particularly to show a relationship between the bore 212 and the wastegate seat 226 as these features cooperate with a wastegate arm and plug such as the wastegate arm and plug 250. As shown in the example of FIG. 6, the wastegate wall 223 extends to the wastegate seat 226, which includes a diameter $D_o$ of a cone section disposed at a cone angle $\phi_o$. As an example, an assembly may include a plug with a cone portion having a cone angle of about 60 degrees while a wastegate seat includes a cone portion with a cone angle of about 100 degrees. In such an example, contact may or may not occur between the two cone portions as sealing may be achieved by contact between a toroidal portion of the plug and the cone portion of the wastegate seat.

Figure 7:
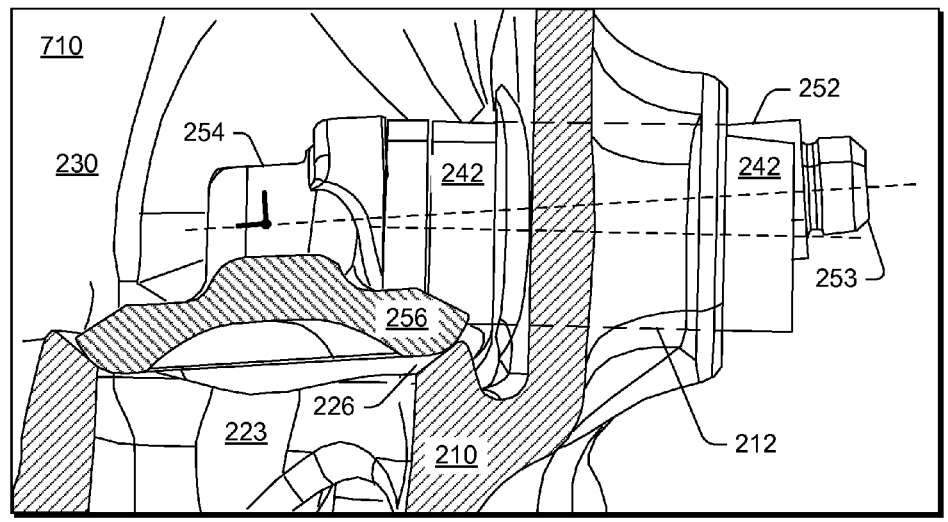
FIG. 7 is a series of cutaway views of a wastegate arm and plug in two different orientations.
Figure 7:
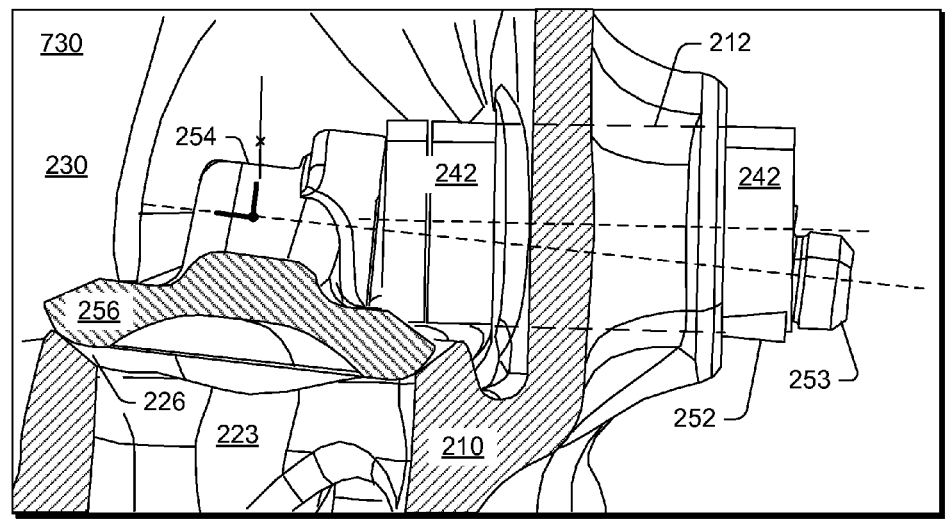

FIG. 7 shows two displaced orientations 710 and 730 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 710 and 730, contact exists between the plug 256 and the wastegate seat 226. In particular, contact exists between a radiused portion (e.g., toroidal portion) of the plug 256 and a conical portion of the wastegate seat 226. As an example, the orientations 710 and 730 may represent maximum angular misalignments with respect to a bore axis of a bore (e.g., ±5 degrees), for example, where some angular misalignment with respect to a bushing axis of a bushing disposed in the bore (e.g., ±1 degree). As mentioned, for a variety of reasons, some misalignment may occur (e.g., during assembly, during operation, etc.).

Figure 8:
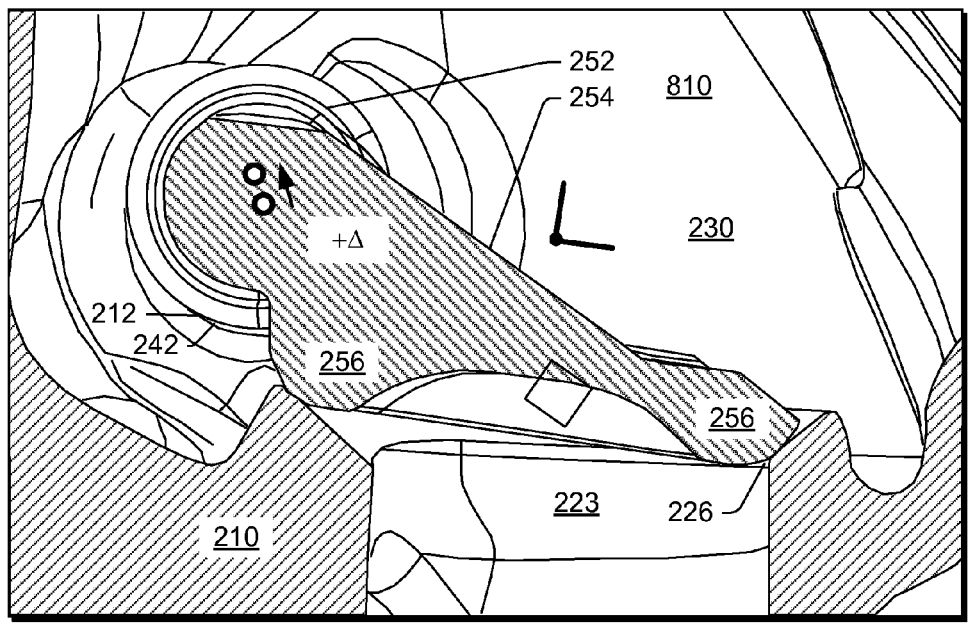
FIG. 8 is a series of cutaway views of a wastegate arm and plug in two different orientations.
Figure 8:
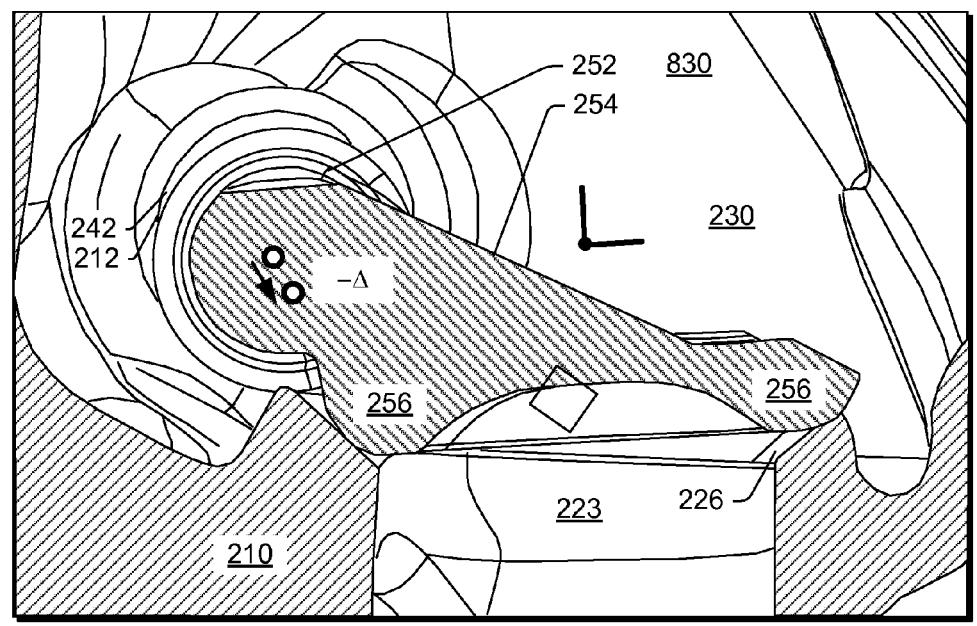

FIG. 8 shows two displaced orientations 810 and 830 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 810 and 830, contact exists between the plug 256 and the wastegate seat 226. In particular, contact exists between a radiused portion (e.g., toroidal portion) of the plug 256 and a conical portion of the wastegate seat 226. As an example, the orientations 810 and 830 may represent maximum displacement misalignments (e.g., Δ) with respect to a bore axis of a bore (e.g., ±1.6 mm), for example, where some displacement misalignment with respect to a bushing axis of a bushing disposed in the bore (e.g., ±0.1 mm). As mentioned, for a variety of reasons, some misalignment may occur (e.g., during assembly, during operation, etc.).

As an example, a wastegate arm and plug may include extreme positions inside a bushing disposed in a bore of a turbine housing while being able to maintain contact with a wastegate seat for purposes of sealing a wastegate passage (e.g., adequate sealing for acceptable performance).

Figure 9:
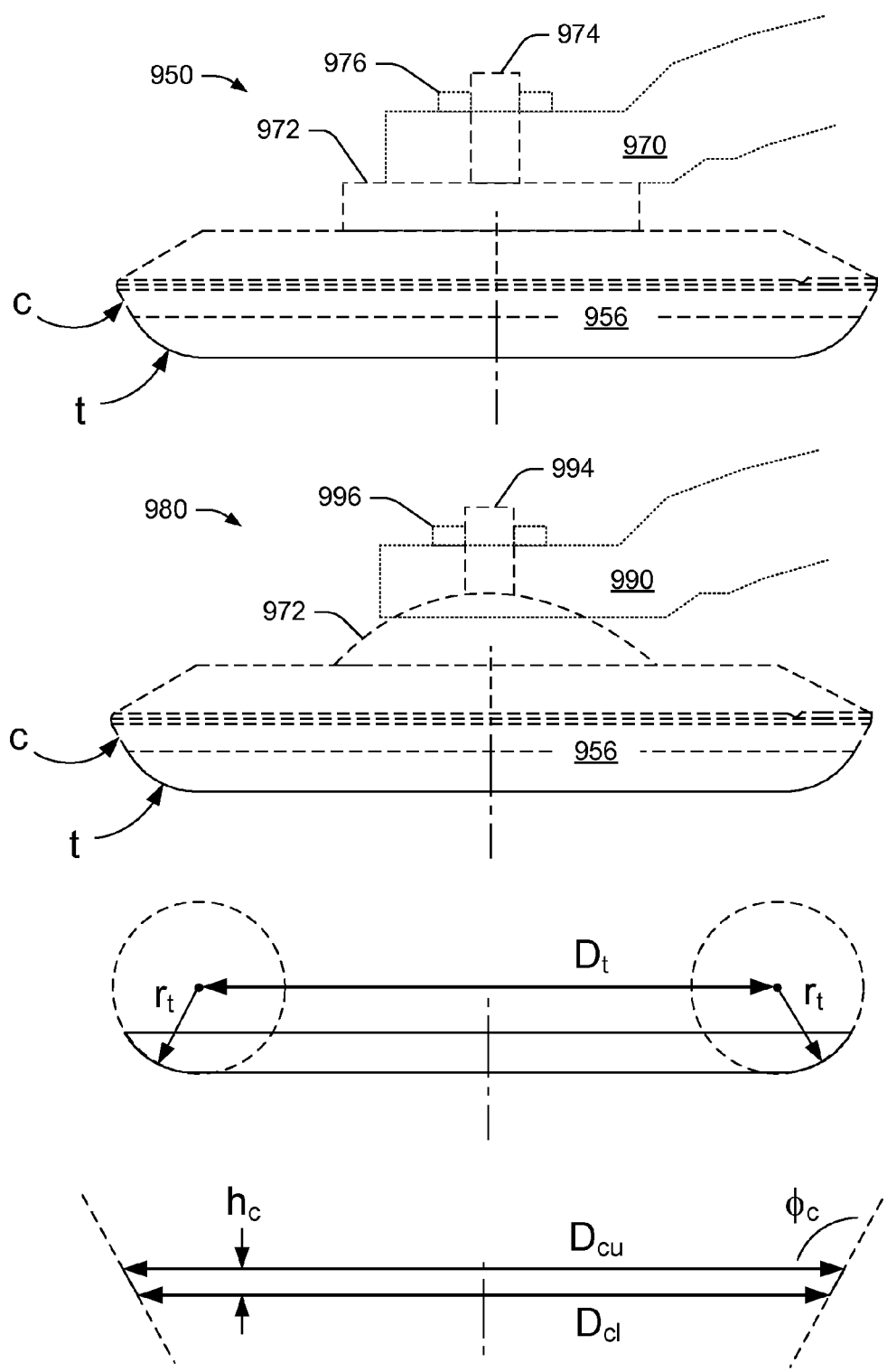
FIG. 9 is a series of diagrams of examples of wastegate arm and plug and profiles thereof.

FIG. 9 shows examples of a wastegate arm and plug 950 and 980, which may be a unitary wastegate arm and plug (e.g., a monoblock wastegate arm and plug) or a wastegate arm and plug assembly. As an assembly, a plug portion 956 may include an attachment base 972 or 992 from which a stem 974 or 994 extends where an arm 970 or 990 fits to the stem 974 or 994, which is secured to the stem 974 or 994 via an attachment component 976 or 996 (e.g., a press-fit ring, etc.). In the example wastegate arm and plug 980, a surface of an attachment base 992 may be defined at least in part by a portion of a sphere. In such an example, the arm 990 may include a surface defined at least in part by a portion of a sphere. In such an example, some pivoting may be provided for the plug portion 956 with respect to the arm 990 (e.g., as provided by some amount of clearance or clearances with respect to the stem 994).

In the example of FIG. 9, the plug portion 956 includes a toroidal portion "t" and, for example, optionally a conical portion "c". As shown, the optional conical portion may be defined by an angle $\phi_c$, a height $h_c$, and at least one of a lower diameter $D_{cl}$ and an upper diameter $D_{cu}$. In the example of FIG. 9, the toroidal portion may be defined by a diameter $D_t$ and a radius $r_t$, for example, where the toroidal portion may be defined by a circular torus.

Figure 10:
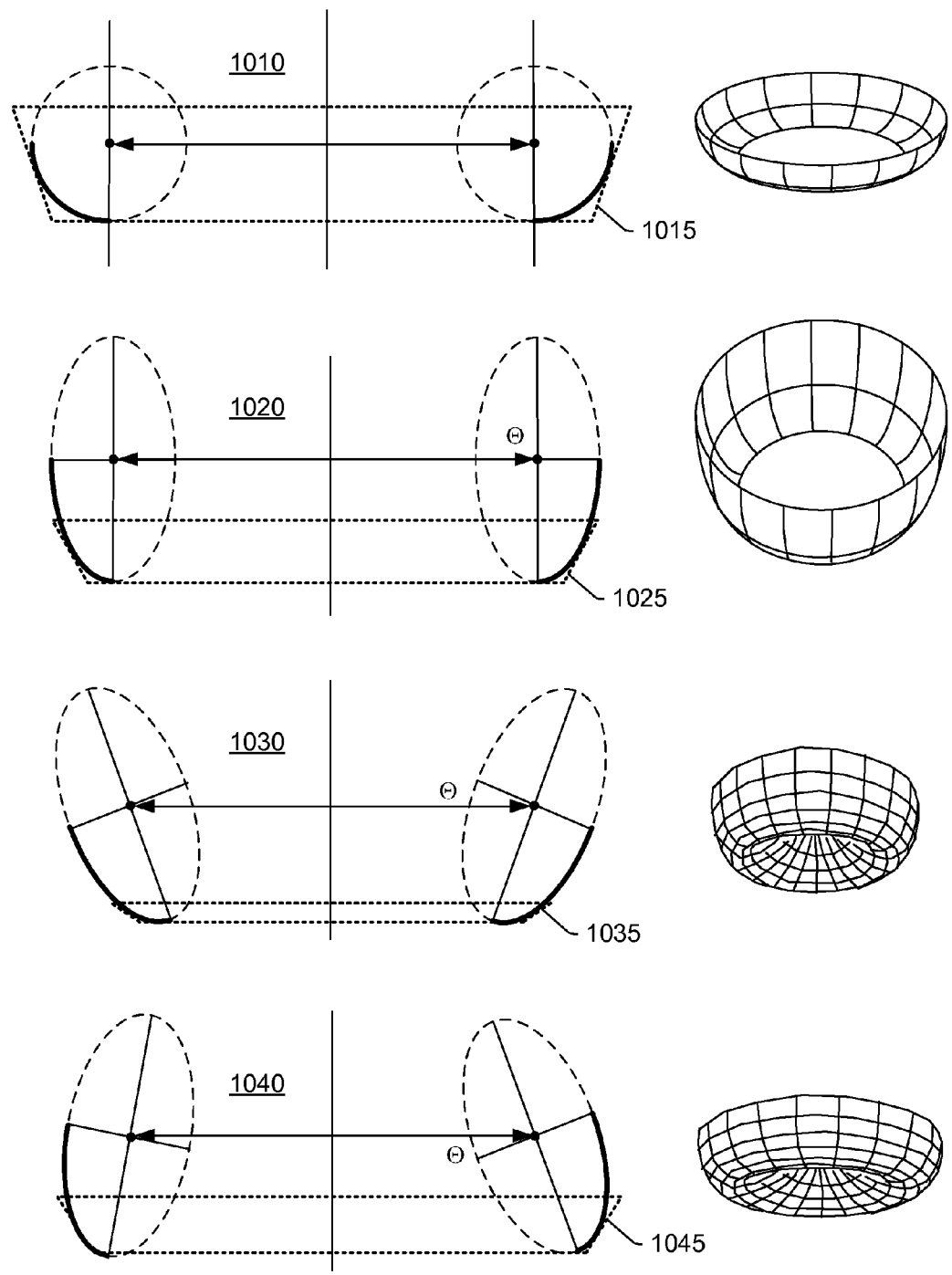
FIG. 10 is a series of views of examples of profiles of a plug.

FIG. 10 shows some examples of toroidal portion profiles of a plug 1010, 1020, 1030 and 1040 along with some examples of seat profiles 1015, 1025, 1035 and 1045. Also shown in FIG. 10 are gridded surfaces that may approximate respective toroidal portions.

As to the example profile 1010, the toroidal portion corresponds to a circle, as to the example profile 1020, the toroidal portion corresponds to an ellipse, as to the example profile 1030, the toroidal portion corresponds to an inwardly tilted ellipse and, as to the example profile 1040, the toroidal portion corresponds to an outwardly tilted ellipse (see, e.g., tilt angle Θ). In the examples 1010, 1020, 1030 and 1040 of FIG. 10, a thick solid line represents a profile that may be a profile of a plug, for example, such as the plug 256. As to the seat profiles 1015, 1025, 1035 and 1045, the dotted lines may represent a profile that may be a profile of a seat, for example, such as the seat 226.

Figure 11:
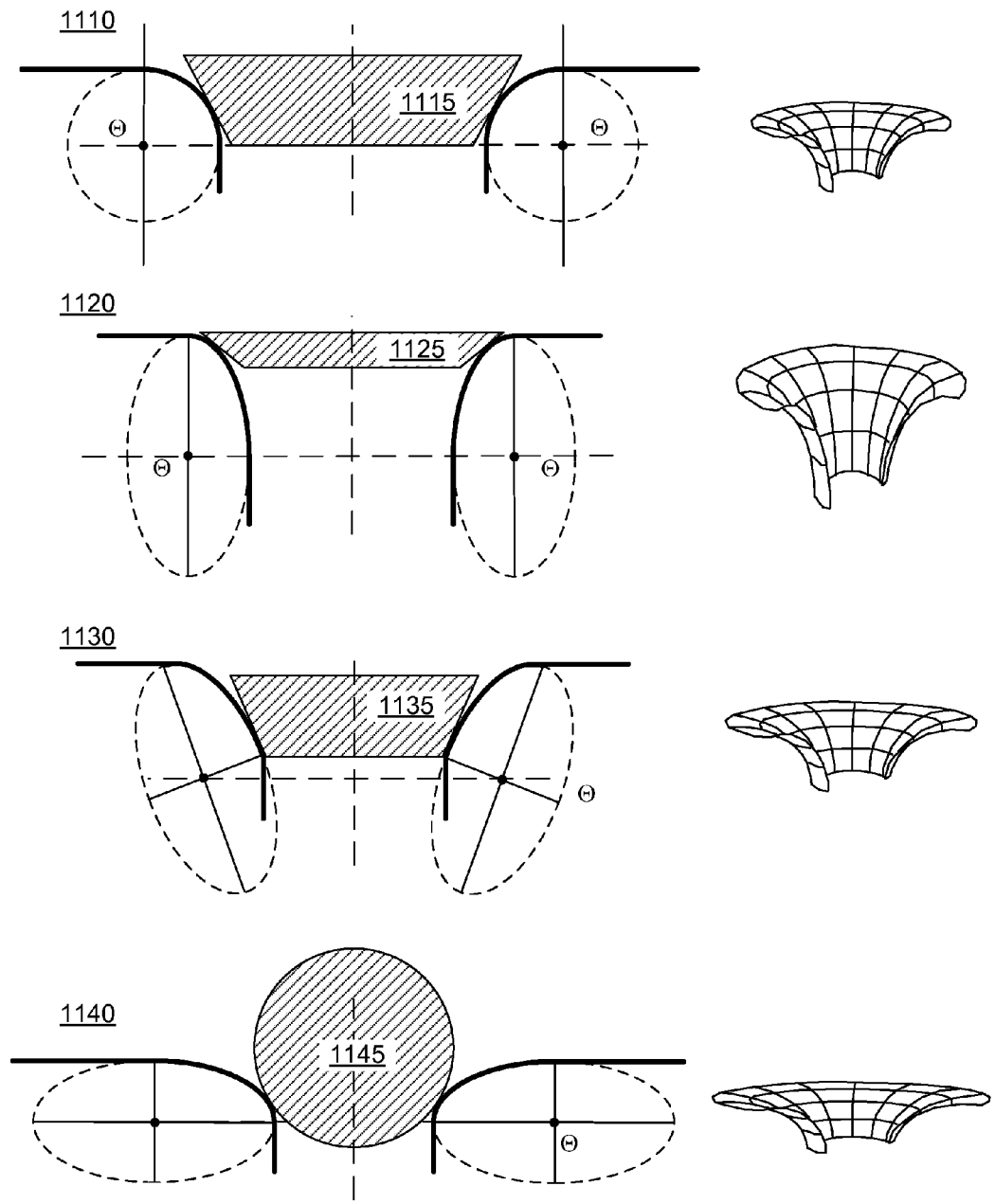
FIG. 11 is a series of views of examples of profiles of a seat.

FIG. 11 shows some examples of seat profiles of a wastegate seat 1110, 1120, 1130 and 1140 along with some examples of plug profiles 1115, 1125, 1135 and 1145. Also shown in FIG. 11 are gridded surfaces that may approximate respective seat profiles. As to the example profile 1110, the seat may be defined by a toroidal portion that corresponds to a circle, as to the example profile 1120, the seat may be defined by a toroidal portion that corresponds to an ellipse, as to the example profile 1130, the seat may be defined by a toroidal portion that corresponds to an outwardly tilted ellipse (see, e.g., tilt angle Θ) and, as to the example profile 1140, the seat may be defined by a toroidal portion that corresponds to an ellipse (e.g., rotated 90 degrees in comparison to the example 1120). In the examples 1110, 1120, 1130 and 1140 of FIG. 11, a thick solid line represents a profile that may be a profile of a seat, for example, such as the seat 226. As to the plug profiles 1115, 1125, 1135 and 1145, they may be a profile of a plug, for example, such as the plug 256. As shown in FIG. 11, a plug may include a conical profile or a spherical profile. As shown in various other examples, a plug may include a toroidal profile.

Figure 12:
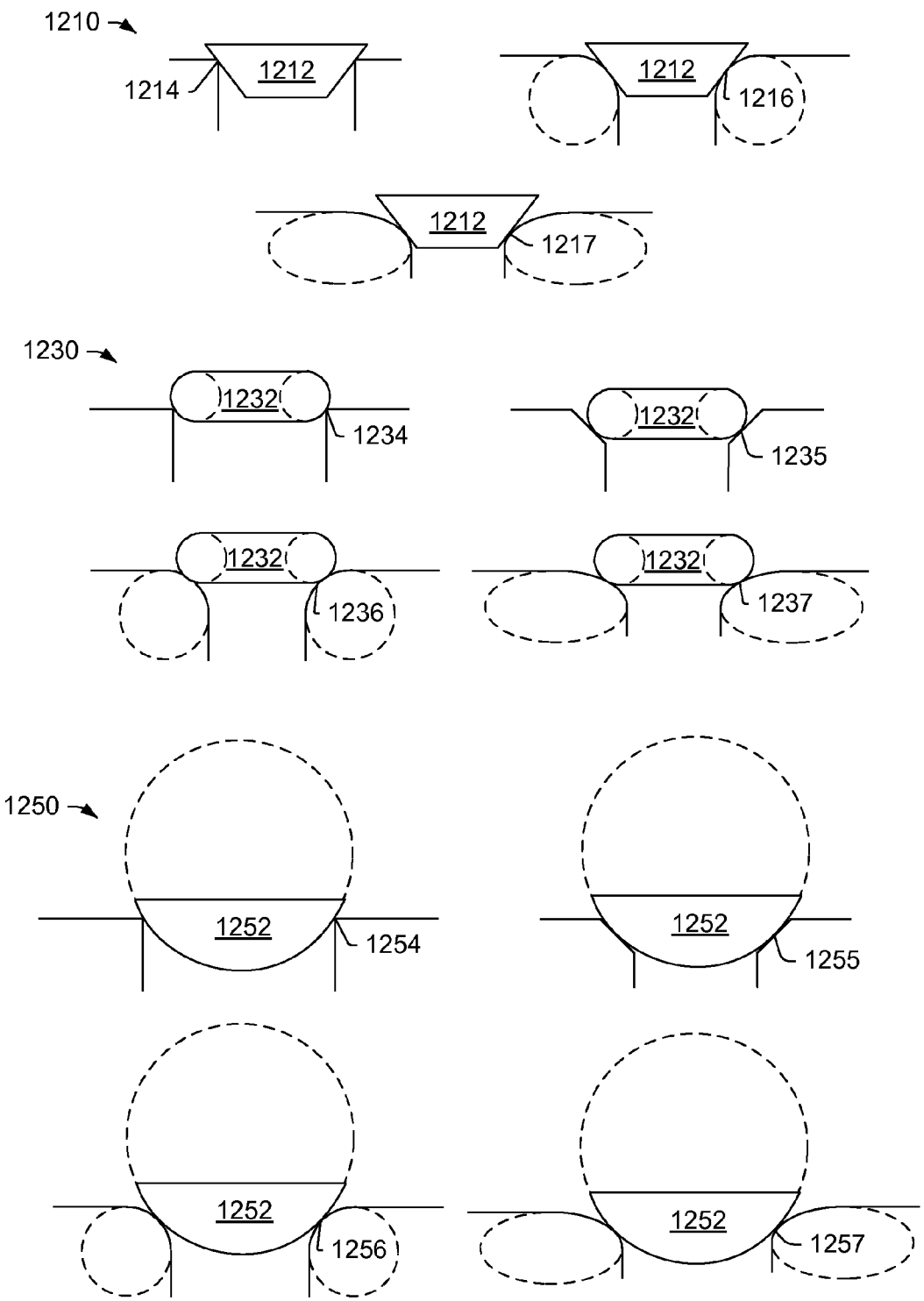
FIG. 12 is a series of views of examples of turbine wastegate plugs and seats.

FIG. 12 shows some examples of turbine wastegates grouped as a conical plug group 1210, a toroidal plug group 1230 and a spherical plug group 1250, which may, for example, include a modified sphere (e.g., a portion of a modified sphere).

In the group 1210, a plug 1212 includes a conical shape and a seat 1214 includes a corner shape 1214, a radiused shape 1216 (e.g., a portion of a toroidal surface) or an elliptical shape (e.g., a portion of an elliptical surface).

In the group 1230, a plug 1232 includes a radiused shape (e.g., a portion of a torodial surface) and a seat includes a corner shape 1234, a conical shape 1235, a radiused shape 1236 or an elliptical shape 1237. As an example, the corner shape 1234 may be formed as a shoulder, for example, optionally without a chamfer (e.g., a sharp corner). In such an example, the shoulder may extend axially downward to a single passage or multiple passages (e.g., of a twin scroll housing), for example, to a dividing wall that is disposed between two passages. As an example, the plug 1232 may form a seal against an edge such as that of the corner shape 1234 to seal an exhaust passage or exhaust passages.

In the group 1250, a plug 1252 includes a shape (e.g., a portion of a spherical surface or a portion of a modified spherical surface) and a seat includes a corner shape 1254, a conical shape 1255, a radiused shape 1256 or an elliptical shape 1257.

In the examples of FIG. 12, a torus may be defined by a radius (or major and minor axes) and a diameter and a sphere or modified sphere may be defined by a radius, radii, one or more major axes, one or more minor axes, etc.; noting that a spherical section or a modified spherical section may be defined by a surface such as a plane cutting a sphere or a modified sphere. As an example, a cone or conical portion may be defined by an angle and an axis and, for example, a position or positions along the axis. The various examples of FIG. 12 may be implemented for a housing that may include a single wastegate passage or, for example, that may include multiple wastegate passages (e.g., two passages of a twin scroll turbine housing).

Figure 13:
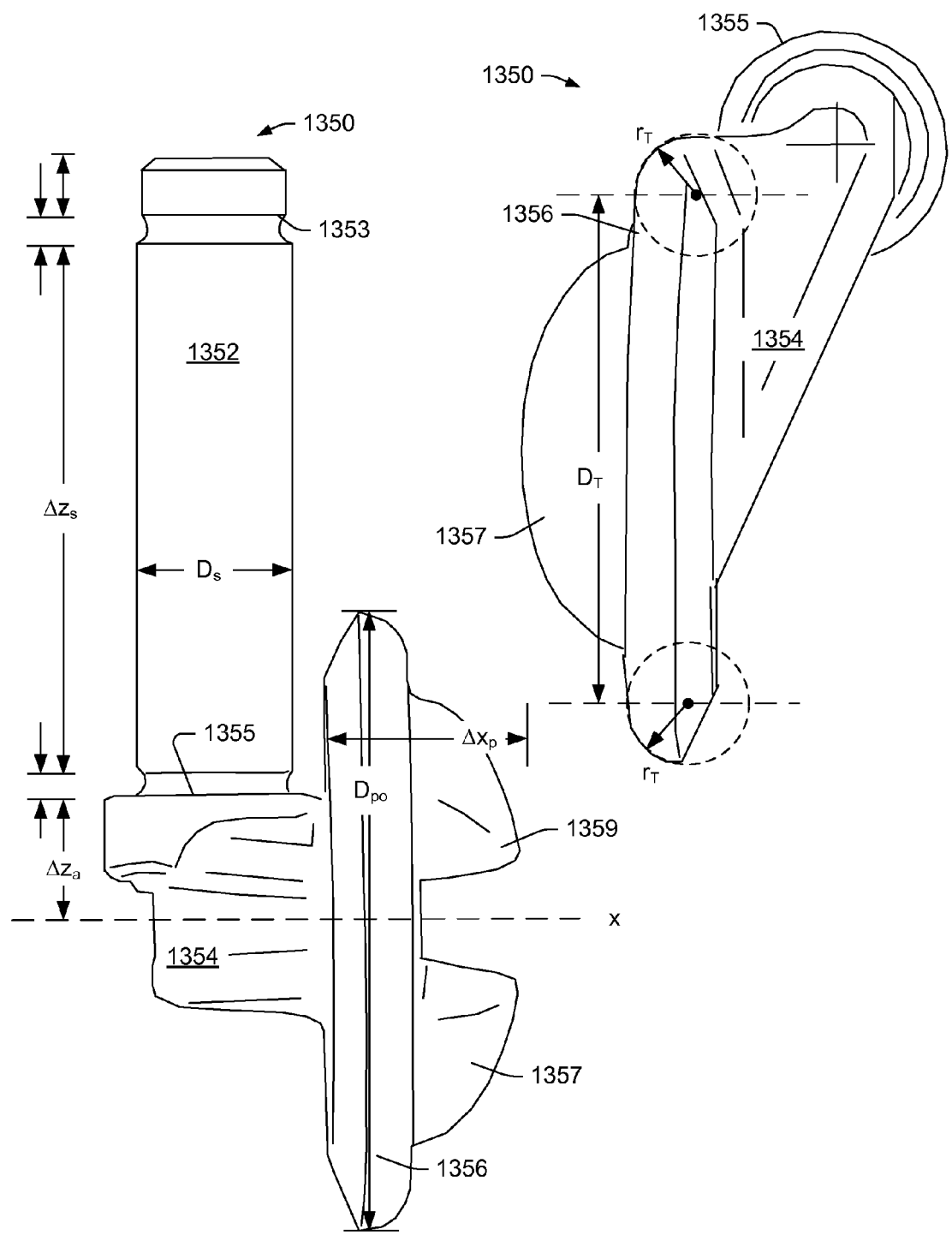
FIG. 13 is a series of views of an example of a wastegate arm and plug.

FIG. 13 shows an example of a wastegate arm and plug 1350 that may be included in an assembly (e.g., an assembly that multiple wastegate passages, a bridge or divider across a wastegate passage, etc.). As an example, the wastegate arm and plug 1350 may be made of material (e.g., metal, alloy, etc.) suitable for temperatures experienced during operation of an exhaust turbine (e.g., of a turbocharger).

In the example of FIG. 13, the wastegate arm and plug 1350 includes a shaft 1352 that includes a diameter $D_s$ over a length $\Delta z_s$, an arm 1354 that extends axially outwardly away from the shaft 1352 from a shoulder 1355 and radially downwardly to a plug 1356. An axial dimension $\Delta z_a$ is shown in the example of FIG. 13 as being a distance from the shoulder 1355 to a centerline of the plug 1356. The plug 1356 is shown as having an outer diameter $D_{po}$. As an example, the centerline of the plug 1356 may define or coincide with an x-axis that may, for example, be used as a reference to describe features of the arm 1354, the plug 1356, angles of rotation of the arm 1354 and the plug 1356, etc. For example, in FIG. 13, the plug 1356 is shown as including two plug portions 1357 and 1359 extending axially outward in a direction of the x-axis (e.g., a distance $\Delta x_p$), for example, from a toroidal portion of the plug 1356 defined at least in part by a radius $r_T$ where, for example, a perimeter of the plug portions 1357 and 1359 is less than a circumference having a diameter $D_T$ associated with the toroidal portion of the plug 1356 (e.g., in a projected view, the perimeter may be within the circumference). As shown in the example of FIG. 13, the plug 1356 includes a first plug portion 1357 shaped approximately as a quarter of a sphere and a second plug portion 1359 shaped approximately as a quarter of a sphere.

As an example, one or more of the plugs 1212, 1232 and 1252 of FIG. 12 may include a first plug portion and a second plug portion such as, for example, the plug portions 1357 and 1359 shown in FIG. 13 (e.g., where seat may be a seat for two wastegate passages). For example, two plug portions may extend downward from the plug 1212 or from the plug 1232. As an example, the plug 1252 may be configured with two plug portions, for example, that extend from a lower surface of the plug 1252 (e.g., consider a cutting plane that cuts the plug 1252 to form a plane from which two plug portions extend downwardly therefrom). As an example, the various shapes in the examples of FIG. 12 may act to seal multiple exhaust passages (e.g., multiple wastegate passages) while plug portions (e.g., extensions) may extend into such passages to form clearances to direct exhaust flow (e.g., such plug portions may be configured to not contact a turbine housing, a wastegate passage wall, etc.).

As mentioned with respect to the wastegate arm and plug 250 of FIG. 2, the wastegate arm and plug 1350 may, likewise, include a dimension $\Delta SP$ as a leg of a triangle that, for example, defines a hypotenuse as a dimension between a rotational axis of the arm 1354 and the centerline of the plug 1356. FIG. 13 also shows various other features, for example, shaft features such as shoulders, contours, etc.

Figure 14:
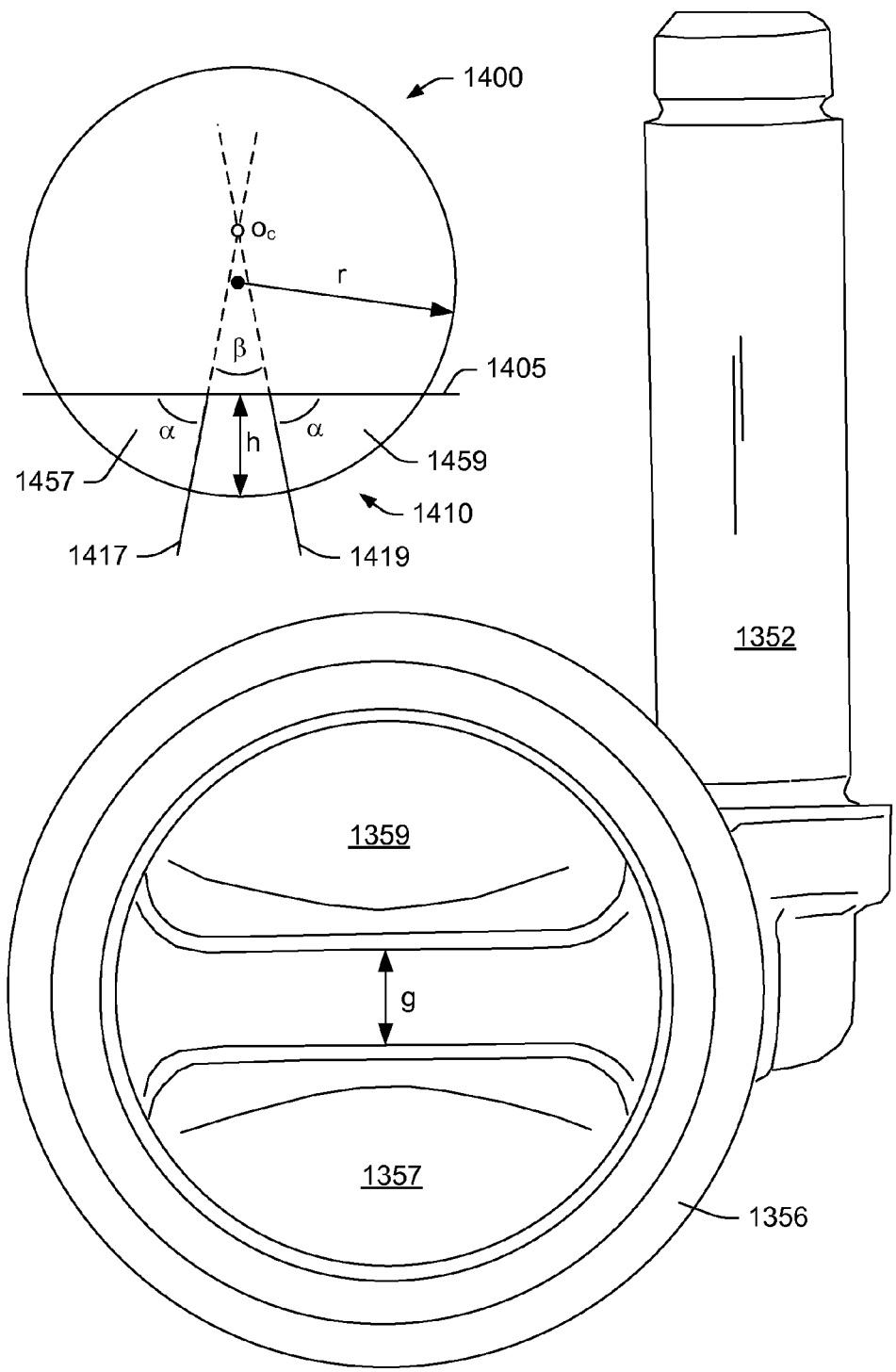
FIG. 14 is a plan view of the wastegate arm and plug of FIG. 13 and a diagram of an example of a sphere cut by cutting planes.

FIG. 14 shows a plan view of the wastegate arm and plug 1350 and an example of a sphere 1400. As an example, the plug portions 1357 and 1359 may be shaped approximately as portions of the sphere 1400. For example, consider the sphere 1400 as having a radius r and a cutting plane 1405 that forms a spherical cap 1410 with a height h. As shown in the example of FIG. 14, the spherical cap 1410 may be cut by two additional cutting planes 1417 and 1419 that may intersect at a locus $o_c$ in the sphere (e.g., a line passing through a locus) with an internal angle β. In such an example, the remaining portions of the spherical cap 1410 may form a plug portion 1457 and a plug portion 1459, which may be characterized at least in part by one or more angles such as the angles α (e.g., defined by the cutting plane 1405 and the respective cutting planes 1417 and 1419). Along the cutting plane 1405, a spacing g may be defined that may be a clearance that can accommodate a divider. As an example, a divider may be a wall that divides a passage to form, at least in part, two openings. As an example, shapes of the plug portions 1357 and 1359 may be modified versions of the plug portions 1457 and 1459 (e.g., with smoothed or rounded off edges, corners, etc.). As an example, the plug 1356 may include a profile such as one of the profiles of FIG. 12 (e.g., of the plug 1212, the plug 1234 or the plug 1254), for example, for purposes of contacting a seat for sealing (e.g., closing) an exhaust opening (e.g., an exhaust opening for two wastegate passages).

As an example, a spacing between two plug portions may be oriented orthogonally to a shaft of a wastegate arm and plug. In such an example, rotation of the wastegate arm and plug about a rotational axis of the shaft can ensure alignment of the spacing with respect to a divider that divides two openings into which the two plug portions may extend. Receipt of the plug portions by two openings can allow a toroidal portion of the plug 1356 to seat in a single seat that serves as part of a sealing mechanism for the two openings. In such an example, the plug portions 1357 and 1359 may enhance operational dynamics (e.g., fluid dynamics) associated with two openings while another portion of the plug 1356 acts to seal both openings (e.g., via a common valve seat).

As an example, a plug portion may include a spherical wedge shape that includes a spherical lune surface. A spherical lune is a portion of a surface of a sphere of radius r cut out by two planes through the azimuthal axis with a dihedral angle. As an example, a dihedral angle of a plug portion may be in a range from about 45 degrees to about 90 degrees. As an example, a plug may include symmetric plug portions where each plug portion may be defined by a dihedral angle (e.g., +90 degrees and −90 degrees). As an example, two plug portions may be spaced from each other, for example, to accommodate a divider therebetween, which may be a wall that divides two passages.

As an example, a plug portion may be shaped as a modified spherical lune. For example, a modified spherical lune may be a wedge of a spherical cap, a wedge of a modified spherical cap, or a modified wedge of a spherical cap. For example, a plug may be defined as having a shape like a spherical cap with a cut-out portion that forms two spaced apart wedges where the spacing between the wedges can accommodate a divider.

Figure 15:
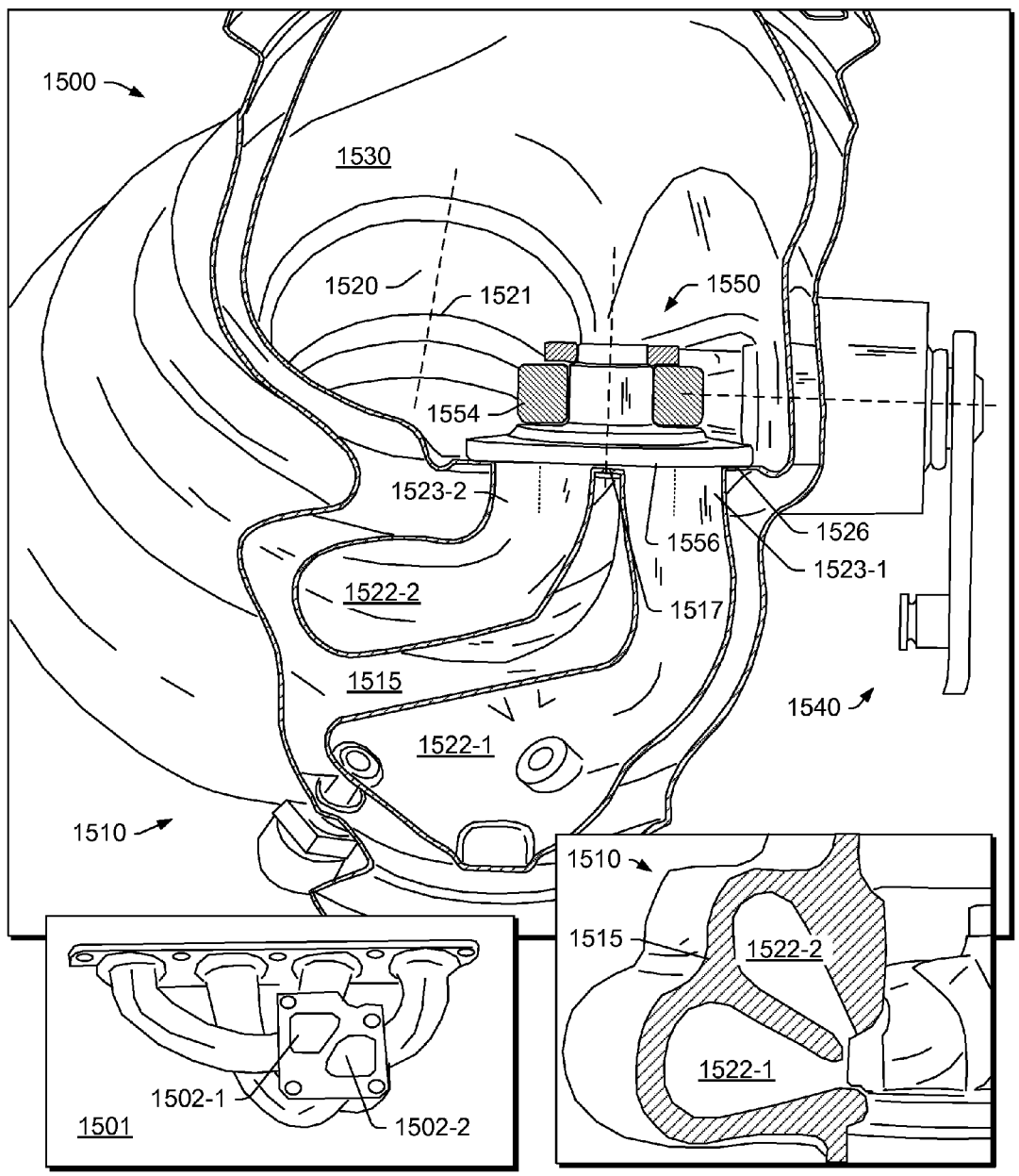
FIG. 15 is a series of views of an example of an assembly that includes two scrolls.

FIG. 15 shows an example of a twin scroll turbine assembly 1500 that may be configured to receive exhaust from a manifold 1501 that includes a two separate exhaust passages, each with its own opening 1502-1 and 1502-2. The assembly 1500 includes a housing 1510 that includes a wall 1515 that defines two scrolls 1522-1 and 1522-2 (e.g., two volutes) that can direct exhaust to a turbine wheel space, for example, via a nozzle or nozzles 1521. As an example, a turbine wheel space may be defined in part by a shroud wall 1520 located axially above the nozzle or nozzles 1521 that extends axially to an exhaust chamber 1530.

In the example of FIG. 15, the housing 1510 includes two wastegate walls 1523-1 and 1523-2 associated with respective scrolls 1522-1 and 1522-2. The two wastegate walls 1523-1 and 1523-2 form openings about which exists a wastegate seat 1526. As shown, the wastegate wall 1523-1 defines a first wastegate passage in fluid communication with a first inlet conduit and the wastegate wall 1523-2 defines a second wastegate passage in fluid communication with a second inlet conduit where, for example, the inlet conduits may be operatively coupled to respective openings 1502-1 and 1502-2 of the manifold 1501. As an example, the manifold 176 of FIG. 1 may be configured to be a divided manifold, for example, where the turbine housing assembly 172 may include twin scrolls (e.g., two volutes). As an example, the cylinder head 154 of FIG. 1 may include divided passages, for example, where the turbine housing assembly 152 may include twin scrolls (e.g., two volutes).

For control of exhaust flow through the wastegate passages, the assembly 1500 includes a wastegate control linkage 1540 and a wastegate arm and plug 1550 with an arm component 1554 and a plug component 1556 that are configured for opening and closing the wastegate passages (e.g., for wastegating exhaust) via seating of the plug component 1556 with respect to the wastegate seat 1526.

The assembly 1500 may be described, for example, with respect to various axes. For example, consider an axis of a turbine wheel space that may coincide with a rotational axis of a turbine wheel, an axis of a shaft of the wastegate arm and plug 1550 and an axis of the plug component 1556. Further, each of the openings of the wastegate passages may be defined by a respective axis, for example, where in a closed state of the wastegate, the axis of the plug component 1556 is approximately aligned parallel to the axes of the openings of the wastegate passages.

As an example, the manifold 1501 may be considered a divided manifold that separates flow of exhaust from cylinders whose cycles may interfere with one another (e.g., as to exhaust pulse energy). For example, on a four-cylinder engine with firing order 1-3-4-2, cylinder #1 is ending its expansion stroke and opening its exhaust valve while cylinder #2 still has its exhaust valve open (cylinder #2 is in its overlap period). In an undivided exhaust manifold, a pressure pulse from cylinder #1's exhaust blowdown event may be more likely to contaminate cylinder #2 with high pressure exhaust gas, which can impact performance of cylinder #2's (e.g., ability to breathe properly) and diminish pulse energy that may have been better utilized in by a turbine. As an example, a proper grouping for the aforementioned engine may keep complementary cylinders grouped together (e.g., exhaust of cylinders #1 and #4 as one complementary group and cylinders #2 and #3 as another complementary group). Such an approach may better utilize exhaust pulse energy and, for example, improve turbine performance (e.g., increase boost more rapidly).

Referring again to the assembly 1500, pulse energy may differ in the two passages 1523-1 and 1523-2 such that one portion of the plug component 1556 experiences different force than another portion of the plug 1556. Such differences may cause vibration, misalignment, wear, etc. For example, as the plug component 1556 includes a stem seated in an opening of the arm component 1554, pressure may cause the plug component 1556 to tilt such that an axis of the stem misaligns with respect to an axis of the opening of the arm component 1554. Over time, wear may occur (e.g., increased clearances), which may exacerbate wear, leakage, etc.

As to leakage, leakage may occur from a passage to the chamber 1530 and/or from one passage to another passage (e.g., and vice versa). For example, due to a pressure difference between the passages, exhaust may flow from the passage formed by the wall 1523-1 to the passage formed by the wall 1523-2 in a space above a divider wall surface 1517 and the plug component 1556. Such flow may act to "equalize" pressures, which may, for example, be detrimental to a divided manifold approach (e.g., or a twin scroll approach). Such flow may be referred to as scroll-to-scroll leakage that occurs for a closed operational state of a wastegate arm and plug (e.g., where a controller, actuator, etc. calls for the passages to be closed).

Figure 16:
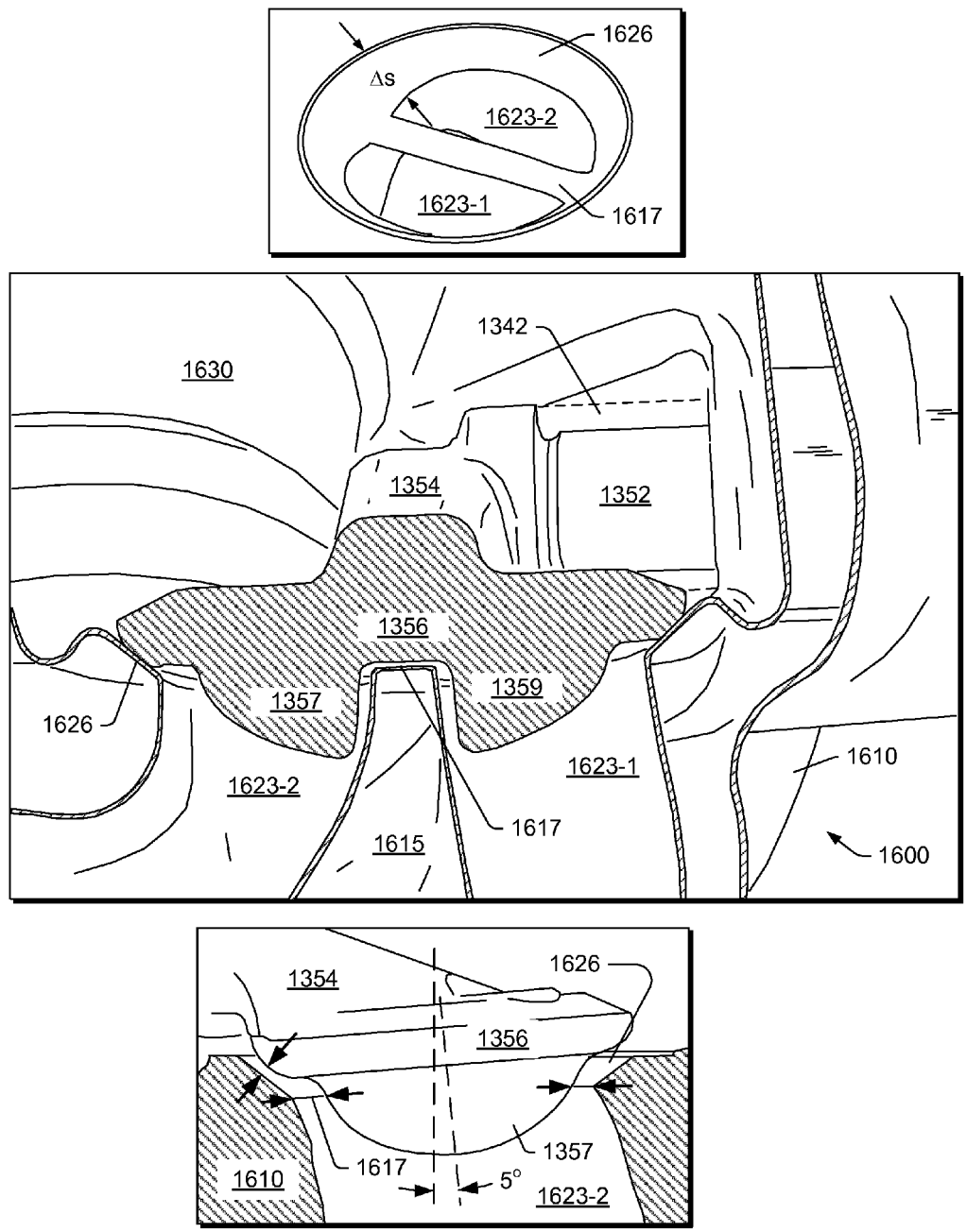
FIG. 16 is a series of views of an example of an assembly that includes the wastegate arm and plug of FIG. 13.

FIG. 16 shows two cutaway views of an example of an assembly 1600 that includes a housing 1610 and the wastegate arm and plug 1350 and shows a perspective view of an example of a wastegate seat 1626. As an example, the wastegate arm and plug 1350 in conjunction with the wastegate seat 1626 may provide for a more progressive flow through a wastegate during wastegate valve opening. As an example, the wastegate seat 1626 may be defined in part by a conical surface (see, e.g., the wastegate seat 226 of FIG. 6).

As shown in the example of FIG. 16, the housing 1610 includes a wastegate walls 1623-1 and 1623-2 that extend to the wastegate seat 1626 and includes an exhaust chamber 1630. In the example of FIG. 16, the turbine housing 1610 may be a single piece or multi-piece housing. As an example, the turbine housing 1610 may be a cast component (e.g., formed via sand casting or other casting process). As an example, the housing 1610 may be made of material (e.g., metal, alloy, etc.) suitable for temperatures experienced during operation of an exhaust turbine (e.g., of a turbocharger).

The turbine housing 1610 includes various walls, which can define features such as a bore, a turbine wheel opening, an exhaust outlet opening, etc. In particular, in the example of FIG. 16, the wastegate walls 1623-1 and 1623-2 define wastegate passages in fluid communication with inlet conduits (e.g., associated with a divided manifold) where a wastegate control linkage and a wastegate arm and plug 1350 are configured for opening and closing the wastegate passages (e.g., for wastegating exhaust). As an example, the assembly 1600 may include a bushing 1342 (see, e.g., dashed lines) that may be disposed in the bore of the turbine housing 1610 and that may abut the shoulder 1355 of the wastegate arm and plug 1350 (see, e.g., the bushing 242 of the assembly 200).

In the perspective view, an example shape for the wastegate seat 1626 is illustrated, for example, where a seat depth (e.g., from the exhaust chamber 1630 to the space defined by the wastegate walls 1623-1 and 1623-2) may be greater on a shaft side (see, e.g., Δs) than on a front side. As shown a divider wall surface 1617 is disposed, for example, at an axial location that is about the level of a lower edge of the conical shaped wastegate seat 1626. As shown in the cutaway view, the two plug portions 1357 and 1359 descend below the divider wall surface 1617 (e.g., of the wall 1615) to form an approximately inverted U-shaped clearance, which may offer resistance to flow of exhaust between passages formed by the walls 1623-1 and 1623-2. Referring again to the assembly 1500 of FIG. 15, a clearance exists between the divider wall surface 1517 and the plug 1556 that does not offer such resistance to flow of exhaust between passages formed by the walls 1523-1 and 1523-2 (e.g., a flow may occur directly across the divider wall surface 1617). As an example, resistance to exhaust flow between such passages may help preserve benefits provided by a divided manifold operatively coupled to a twin scroll turbine housing (e.g., of a turbocharger).

FIG. 16 shows how the toroidal portion and two plug portions 1357 and 1359 of the plug 1356 may be oriented with respect to the wastegate seat 1626, which may be a conical seat. As shown, the toroidal portion of the plug 1356 can seat against the wastegate seat 1626 when the wastegate arm and plug 1350 is in a closed position. Further, in a closed position, a clearance exists about each of the two plug portions 1357 and 1359 (e.g., the two plug portions 1357 and 1359 do not contact the wastegate seat 1626).

As shown in a lower cutaway view, when the wastegate arm and plug 1350 is in an open position of approximately 5 degrees (e.g., about 5 degrees of rotation of the shaft 1352 in a bore of the housing 1610), surfaces of the two plug portions 1357 and 1359 of the plug 1356 define clearances with respect to the wastegate seat 1626 (see, e.g., front side and shaft side arrows). Where a pressure differential exists (e.g., higher pressure on the wastegate wall side 1623-1 and/or 1623-2), exhaust may flow through the clearances where characteristics of such flow is determined, in part, by the surfaces of the two plug portions 1357 and 1359 of the plug 1356 and, in part, by the surface of the wastegate seat 1626. For example, flow may impinge against the surfaces of the two plug portions 1357 and 1359 of the plug 1356, for example, to form a stagnation point on each of the two plug portions 1357 and 1359 about which flow is diverted radially outwardly therefrom and, for example, toward a clearance between the plug 1356 and the wastegate seat 1626.

Further, as shown in the example of FIG. 16, on a shaft side of the plug 1356, the toroidal portion of the plug 1356 also defines a clearance with respect to the wastegate seat 1626 (e.g., where rotation rotates the front side of the plug 1356 a greater arc distance than the shaft side of the plug 1356). Accordingly, in the example of FIG. 16, for the assembly 1600, both the toroidal portion and the two plug portions 1357 and 1359 of the plug 1356 define clearances with respect to the wastegate seat 1626 of the housing 1610. These clearances (e.g., over a range of "open" angles), act to "control" characteristics of exhaust flow. For example, flow characteristics may be controlled by inter-component clearance shapes over a range of open angles in a manner that enhances controllability of a wastegate. As an example, the assembly 1600 may provide for a monotonic and smooth evolution of pressure with respect to wastegate valve opening where such characteristics enhance controllability of the wastegate valve. Such an approach may particularly enhance control where a wastegate valve actuator is a mechanical vacuum actuator (e.g., an actuator to rotate a wastegate arm and plug with respect to a wastegate seat).

As an example, an assembly such as the assembly 1600 may be operatively coupled to a manifold such as the manifold 1501 of FIG. 15 or the manifold 176, which may be a divided manifold. As an example, an assembly such as the assembly 1600 may be operatively coupled to a cylinder head such as the cylinder head 154 of FIG. 1, for example, where passages 156 may be divided (e.g., twin passages) within the cylinder head 154 to direct exhaust from respective cylinders (e.g., complementary group #1 and #4 and complementary group #2 and #3) to the assembly (e.g., to respective scrolls of a twin scroll housing).

Figure 17:
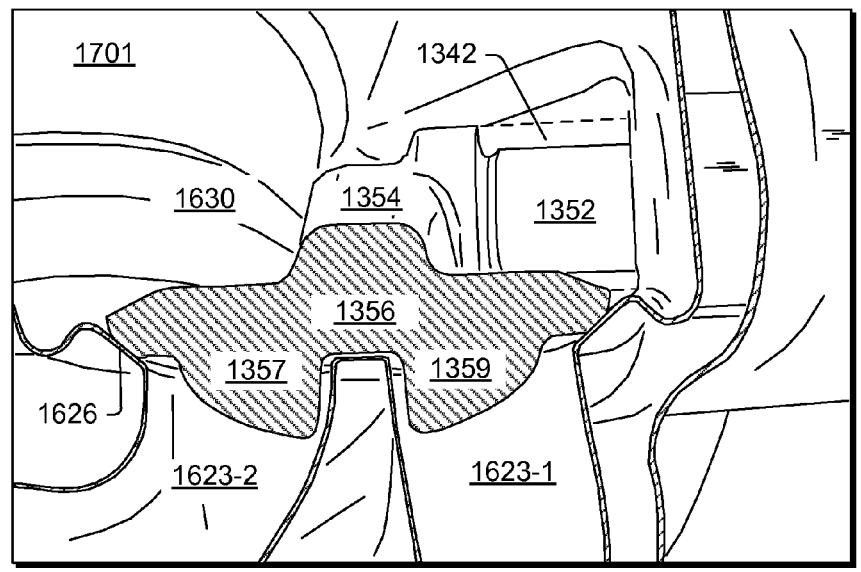
FIG. 17 is a series of views of the assembly of FIG. 16 in various operational states.
Figure 17:
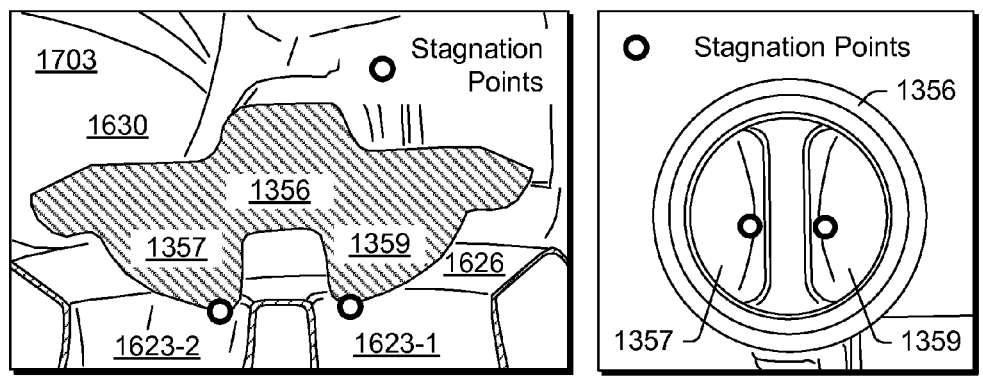
Figure 17:
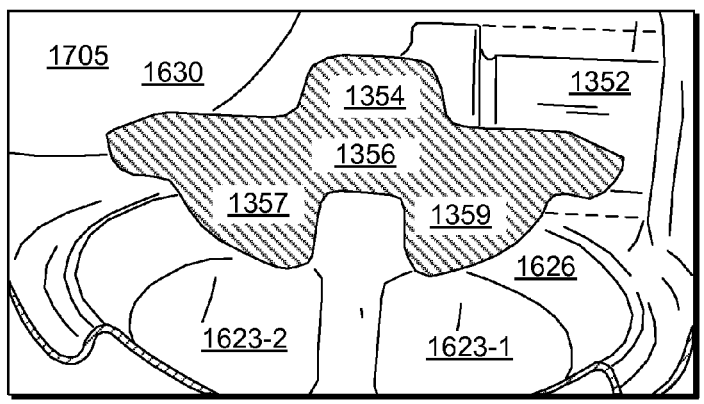

FIG. 17 shows cutaway views of the wastegate arm and plug 1350 in three different states 1701, 1703 and 1705 with respect to the wastegate seat 1626 along with a plan view of the plug 1356. In the state 1701, the approximately inverted U-shaped path is shown with respect to the divider wall surface 1617, which may offer resistance to exhaust flow between passages formed by the walls 1623-1 and 1623-2, while a toroidal portion of the plug 1356 seats against the wastegate seat 1626 to seal the passages from the chamber 1630. In the state 1703, various clearances exist and, for example, exhaust from each passage may impinge upon a respective one of the two plug portions 1357 and 1359, for example, forming respective stagnation points (e.g., maximum surface pressure points). In the state 1705, the two plug portions 1357 and 1359 are axially above the lower edge of the conical shaped seat 1626 and thus out of the passages formed by the walls 1623-1 and 1623-2.

As to stagnation points, which may be points of maximum pressure (e.g., force) upon the plug 1356 of the wastegate arm and plug 1350, these may be located relatively centrally during opening of the wastegate. In such an example, forces exerted upon the plug 1356 may be more effectively transferred to the arm 1354 and the shaft 1352, which, in turn, may act to diminish vibration, misalignment, etc.

As an example, in fluid dynamics, a stagnation point may be a point in a flow field where local velocity of fluid is approximately zero. A stagnation point may exist at a surface of an object in a flow field, for example, where fluid is brought to rest by presence of the object in the flow field (e.g., consider a bluff body in a flow field). As an example, the Bernoulli equation may demonstrate how static pressure is highest where velocity is zero (e.g., such that static pressure or "stagnation pressure" may be at its maximum value at a stagnation point). Where the object is movable in a flow field via an actuator, the pressure experienced by the object may be transmitted to the actuator. If a movable object "catches" wind while being moved by an actuator (e.g., a sharp transition such as a step transition in pressure), the actuator may be impacted as well. As an example, the shape of the plug 1356 (e.g., via the two plug portions 1357 and 1359) may help reduce impact on an actuator as the actuator rotates the plug 1356 with respect to a wastegate opening that provide for flow of exhaust.

In the example assembly 1600, the wastegate arm and plug 1350 may include a shoulder that seats at or proximate to a surface of the housing 1610 (e.g., such that the shaft 1352 may not be visible in the views of FIGS. 16 and 17). As an example, the assembly 1600 may include a bushing (see, e.g., dashed lines of the bushing 1342 in FIG. 16) such as, for example, the bushing 242 of the assembly 200 (see, e.g., FIGS. 2, 3, 7 and 8). For example, such a bushing may be disposed in a bore of a housing and extend to the shoulder 1355 of the wastegate arm and plug 1350.

Various views of FIGS. 15, 16 and 17 are shown as "see-through" cutaway views where solid walls may be shown as being hollow, for example, to more clearly illustrate contours of such walls, shapes of passages, etc.

An assembly can include a turbine housing that includes a bore, a wastegate seat and two wastegate passages that extend to the wastegate seat; a rotatable wastegate shaft configured for receipt by the bore; a wastegate arm extending from the wastegate shaft; and a wastegate plug extending from the wastegate arm where the wastegate plug comprises a profile defined in part by a portion of a torus, for contacting the wastegate seat in a closed state, and defined in part by two plug portions, for defining clearances with respect to the wastegate seat in an open state. In such an assembly, at least the wastegate arm and the wastegate plug may be a unitary component (e.g., a monoblock wastegate arm and plug).

As an example, an assembly may include two plug portions where each of the two plug portions includes a surface defined at least in part by a portion of a spherical lune. As an example, an assembly may include two plug portions where each of the two plug portions includes a shape defined at least in part by a portion of a spherical wedge.

As an example, an assembly may include a turbine housing with a divider wall disposed between two wastegate passages. In such an example, a wastegate plug may include a gap between two plug portions that accommodates the divider wall in the closed state. As an example, a divider wall may be approximately orthogonal to a rotational axis of a wastegate shaft that can orient a wastegate arm and plug.

As an example, a wastegate seat may include a conical shape. As an example, the conical shape may include an upper edge and a lower edge. As an example, the lower edge may join a divider wall disposed between two exhaust passages. As an example, a wastegate seat may include a shoulder (e.g., optionally approximately 90 degrees) that includes an edge (e.g., optionally a sharp edge) where a portion of a plug (e.g., a torus portion) contacts the edge in a closed state.

As an example, a wastegate plug may include two plug portions that, in a closed state, extend into respective exhaust passages, which may be associated with respective scrolls (e.g., volutes). In such an example, in the closed state, the two plug portions may define clearances with respect to the exhaust passages while, for example, another portion of the wastegate plug seats against a wastegate seat (e.g., to close the exhaust passages). In such an example, the shape of each of the two plug portions may act to direct flow of exhaust upon transition from a closed state to an open state and, for example, direct force. For example, a shape of a plug portion may dictate location of a stagnation point, which may be associated with a maximum pressure for the plug portion. A shape may act to maintain a stagnation point more centrally and possibly toward a shaft side of a wastegate plug, which, in turn, may enhance controllability of the wastegate plug (e.g., via a shaft). As an example, a wastegate plug with two plug portions extending therefrom may provide for a monotonic actuation force (e.g., with respect to angle of opening).

As an example, in the closed state, each of two plug portions of a wastegate plug may extend into a respective one of two wastegate passages (e.g., associated with a twin scroll turbine). As an example, a turbine housing may include two volutes (e.g., two scrolls).

As an example, a wastegate shaft may include an axis and a bore of a turbine housing may include an axis where, for a predetermined angular misalignment of the axes, a wastegate plug, along a profile defined in part by a portion of the torus, provides for contacting a wastegate seat of the turbine housing in a closed state.

As an example, a wastegate shaft may include an axis and a bore of a turbine housing may include an axis where, for a predetermined displacement misalignment of the axes, a wastegate plug, along a profile defined in part by a portion of the torus, provides for contacting a wastegate seat of the turbine housing in a closed state.

As an example, in a closed state, an approximately inverted U-shaped clearance may exist between a divider wall and two plug portions of a wastegate plug where the divider wall is disposed between two wastegate passages and where each of the two plug portions is received by a respective one of the two wastegate passages.

As an example, a wastegate seat can include a conical shaped portion that extends between an upper edge and a lower edge. In such an example, a housing may include a divider wall disposed between two wastegate passages that extends to the lower edge of the conical shaped portion of the wastegate seat.

As an example, two plug portions of a wastegate plug may include shapes defined in part by a spherical cap cut by two cutting planes. In such an example, the two plug portions may include a gap therebetween defined at least in part by the two cutting planes and, for example, a height of each of two plug portions of a wastegate plug may be less than a height of a spherical cap.

As an example, a wastegate arm and plug can include an arm; and a plug that extends from the arm where the plug includes a seat surface and two plug portions separated by a gap, each of the plug portions defined at least in part by a portion of a spherical wedge. In such an example, the seat surface may include a perimeter that exceeds a perimeter formed by the two plug portions as separated by the gap.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
   a turbine housing that comprises a bore, a wastegate seat and two wastegate passages that extend to the wastegate seat;
   a rotatable wastegate shaft configured for receipt by the bore;
   a wastegate arm extending from the wastegate shaft; and
   a wastegate plug extending from the wastegate arm wherein the wastegate plug comprises a profile defined in part by a portion of a torus, for contacting the wastegate seat in a closed state, and defined in part by two plug portions, for defining clearances with respect to the wastegate seat in an open state wherein in the closed state each of the two plug portions of the wastegate plug extends into a respective one of the wastegate passages.

2. The assembly of claim 1 wherein at least the wastegate arm and the wastegate plug comprise a unitary component.

3. The assembly of claim 1 wherein each of the two plug portions comprises a surface defined at least in part by a portion of a spherical lune.

4. The assembly of claim 1 wherein each of the two plug portions comprises a shape defined at least in part by a portion of a spherical wedge.

5. The assembly of claim 1 wherein the turbine housing comprises a divider wall disposed between the two wastegate passages.

6. The assembly of claim 5 wherein the wastegate plug comprises a gap between the two plug portions that accommodates the divider wall in the closed state.

7. The assembly of claim 5 wherein the divider wall is approximately orthogonal to a rotational axis of the wastegate shaft.

8. The assembly of claim 5 wherein, in the closed state, an approximately inverted U-shaped clearance exists between the divider wall and the two plug portions.

9. The assembly of claim 1 wherein the wastegate seat comprises a conical shape.

10. The assembly of claim 1 wherein the turbine housing comprises two volutes.

11. The assembly of claim 1 wherein the wastegate shaft comprises an axis and the bore comprises an axis and wherein for a predetermined angular misalignment of the axes of ±5 degrees, the wastegate plug, circumferentially along the profile defined in part by the portion of the torus, is in contact with the wastegate seat in the closed state.

12. The assembly of claim 1 wherein the wastegate shaft comprises an axis and the bore comprises an axis and wherein for a predetermined displacement misalignment of the axes of ±1.6 mm, the wastegate plug, circumferentially along the profile defined in part by the portion of the torus, is in contact with the wastegate seat in the closed state.

13. The assembly of claim 1 wherein the wastegate seat comprises a conical shaped portion that extends between an upper edge of the conical shaped portion and a lower edge of the conical shaped portion.

14. The assembly of claim 13 wherein the housing comprises a divider wall disposed between the two wastegate passages that extends to the lower edge of the conical shaped portion of the wastegate seat.

15. The assembly of claim 1 wherein the two plug portions comprise shapes defined in part by a spherical cap cut by two cutting planes wherein the two plug portions comprise a gap therebetween defined at least in part by the two cutting planes.

16. The assembly of claim 15 wherein a height of each of the two plug portions is less than a height of the spherical cap.

17. The assembly of claim 1 wherein the wastegate seat comprises a shoulder that comprises an edge wherein the portion of a torus contacts the edge in the closed state.

18. An assembly comprising:
   a turbine housing that comprises a bore, a wastegate seat and two wastegate passages that extend to the wastegate seat;
   a rotatable wastegate shaft configured for receipt by the bore;
   a wastegate arm extending from the wastegate shaft; and
   a wastegate plug extending from the wastegate arm wherein the wastegate plug comprises a profile defined in part by a portion of a torus, for contacting the wastegate seat in a closed state, and defined in part by two plug portions, for defining clearances with respect to the wastegate seat in an open state, wherein the wastegate seat comprises a conical shaped portion that extends between an upper edge of the conical shaped portion and a lower edge of the conical shaped portion and wherein the housing comprises a divider wall disposed between the two wastegate passages, wherein the divider wall extends to the lower edge of the conical shaped portion of the wastegate seat.

* * * * *